US006641725B1

(12) United States Patent
Barnes

(10) Patent No.: US 6,641,725 B1
(45) Date of Patent: Nov. 4, 2003

(54) APPARATUS FOR THE MAGNETIC TREATMENT OF FLUIDS

(76) Inventor: Deborah Barnes, 1626 W. 150 South, West Point, UT (US) 84015

( * ) Notice: Subject to any disclaimer, the term of this patent is extended or adjusted under 35 U.S.C. 154(b) by 0 days.

(21) Appl. No.: 10/166,789

(22) Filed: Jun. 11, 2002

(51) Int. Cl.[7] .......................... B01D 35/06; C07F 1/48
(52) U.S. Cl. .................................... 210/222; 335/303
(58) Field of Search .............................. 210/222, 695, 210/223; 335/302, 303

(56) References Cited

U.S. PATENT DOCUMENTS 4,216,092 A * 8/1980 Shalhoob et al. ........... 210/222
5,078,871 A * 1/1992 McCready .................. 210/222
5,348,050 A * 9/1994 Ashton ...................... 210/222
5,776,334 A * 7/1998 Cho .......................... 210/222
6,110,380 A * 8/2000 Barbera-Guillem ......... 210/222

FOREIGN PATENT DOCUMENTS

WO WO 9816320 A1 * 4/1998 ............. B03C/1/28

* cited by examiner

*Primary Examiner*—David A. Reifsnyder

(57) ABSTRACT

A method and apparatus is disclosed for magnetic treatment of fluids by concentrating magnetic fields on the fluids. One embodiment of the invention generally comprises a length of a flexible magnet, with an adhesive backing, wrapped 1 or more times around the outside surface of a conduit through which a fluid is passed. In an alternate embodiment a length of a flexible magnet, with an adhesive backing, is wrapped 1 or more times against the inside surface of a conduit through which a fluid is passed. The flexible magnets have various magnetic pole arrangements and various methods for holding them in place.

14 Claims, 2 Drawing Sheets

APPARATUS FOR THE MAGNETIC TREATMENT OF FLUIDS

BACKGROUND OF THE INVENTION

This invention relates to a method and apparatus for magnetic treatment of fluids. A considerable amount of study and development has been conducted indicating empirically that magnetically treated fluids, such as water, contribute effectively to the prevention, loosening, and removal of crust and scale from the inner surfaces of conduits, tanks, and the like. It has been found that exposure of fluids to predominantly south pole magnetic fields are particularly effective in reducing crust and scale buildup on conduit walls.

Prior art devices for accomplishing this fluid or liquid treatment have used plural horseshoe or bar magnets or the like where the magnets are adjacent to the pipe through which the fluids flow, in various pole arrangements, comprising a casing or plate to which the magnets are attached so they can be attached to a conduit. It has been found that a flexible magnetic device, that does not require plural bar magnets attached to a casing or plate to be attached to a conduit, can provide fluid treatment at a much-reduced cost.

It has also been found that flexible magnets, especially high strength flexible magnets with a gauss rating of 2,000 or more are very effective in the treatment of fluids, especially of smaller conduits. A flexible magnet can be sized to provide a larger surface area, to provide a larger magnetic field, to be a very effective fluid treatment device, and at a very low cost. A flexible magnet can be wrapped several times around a conduit to increase the magnetic field strength. A flexible magnet is faster and easier to install, especially when provided with an adhesive backing. A flexible magnet wrapped completely around the circumference of a conduit provides a more uniform magnetic field than with any other type of magnet, further increasing the effectiveness of the device. Therefore, it would be exceedingly advantageous to magnetically treat fluids in a more efficient and economical manner than has been done previously. These and other objects and features of the present invention will become more apparent from the following description taken together with the accompanying drawings.

DESCRIPTION OF THE PRIOR ART

Applicant is aware of the following U.S. Pat. Nos. concerning magnetic fluid treatment.

Vermeiren U.S. Pat. No. 2,652,925 teaches a treatment device which produces a magnetic field and a passage for the liquid to be treated.

Menold U.S. Pat. No. 4,265,754 provides an apparatus for treating fresh water by producing a magnetic field in proximity to a flow of water within a water conduit.

Zimmerman U.S. Pat. No. 4,265,755 provides a magnetic water treating device within a conduit. This device provides easy assembly without adversely affecting the ultimate functional capability of the overall unit.

Schiesser U.S. Pat. No. 4,265,756 provides a change device for sieves used for filtering plastic materials. The sieves can be changed with this device without interrupting the transport of the material which is being processed. Kulish U.S. Pat. No. 4,605,496 provides a device for magnetic treatment of liquids by concentrating magnetic fields on the liquids to provide descaling and deliming.

Weisenbarger U.S. Pat. No. 4,711,271 provides a magnetic fluid conditioner for abating the adherence of precipitates in conduits transmitting a variety of fluids which contain unwanted compounds which will precipitate and adhere to the inner walls of the conduits.

Walsh U.S. Pat. No. 4,836,932 provides a method for the fabrication and use in modifying the physicochemical properties of water. This device uses fine particle super ferromagnets or super paramagnets dispersed in nonmagnetic media.

McGrath U.S. Pat. No. 5,024,759 provides a device for magnetically treating a flowing fluid. This device uses a magnetic structure comprising the plurality of magnets made from rare earth materials and are arranged around the inside surface of a ring and with the north poles of the magnets facing inwardly.

Holcomb U.S. Pat. No. 5,113,751 provides water treatment by using magnetic treatment or electromagnetic treatment by direct injection in the fluid stream or a combination of such water treatment systems. Note Column 3, lines 33–48, regarding the magnet orientations.

Spiegel U.S. Pat No 5,200,071 provides a fluid treatment system for changing the rates of growth of certain crystals formed within a fluid. This device has a variable speed motor and a wheel assembly mounted on the shaft. An array of magnets is concentrically arranged in a circular pattern about the shaft on the inner surface of each of the disks wherein sufficient magnetic force is provided to accomplish beneficial effects on impurities of the fluid.

Clair U.S. Pat. No. 5,227,683 provides a permanent magnet fluid generator with powerfull magnetic field condensers which utilize neodymium magnets to magnetically saturate steel pole pieces. In this device, the fluid generates an electrical current that can be utilized to protect the pipe from scale and corrosion.

Curtis U.S. Pat. No. 5,238,558 teaches a magneto-hydrodynamic system and method for the treatment of pipes and the fluid carried in the pipes to prevent scaling and build-up of deposits. In this device, a pipe for carrying fluid and four magnets are utilized, with each magnet having a magnetic field density of about 6,700 gauss, end pole pieces on each end of the magnet units and a top pole piece covering the surface of the magnets on a side of the magnets opposite the side in contact with the pipe to be treated.

Ellison U.S. Pat. No. 5,296,141 provides a magnetic device for treating fluid flowing through a conduit. Permanent magnets are utilized and a mass of non-ferromagnetic filler material in the interior compartment encapsulates the magnets.

Schoepe U.S. Pat. No. 5,378,362 provides a system for treating water to reduce calcium carbonate deposits. Pairs of magnets are utilized to facilitate changing of the spacing between adjacent magnets.

Glass U.S. Pat. No. 6,056,872 provides a device for the magnetic treatment of fluids. The device includes a plurality of magnets for imparting a magnetic field is arranged peripherally about a pipe.

Paterson U.S. Pat. No. 6,171,504 provides a magnetic water or fluid treatment system consisting of strong magnets arranged in a specific spacial and polar orientation to form a treating device for mounting on fluid-carrying pipes.

SUMMARY OF THE INVENTION

It is therefore an object of the invention to magnetically treat fluids in a more efficient and economical manner than has been done previously.

It is a further object of the invention to magnetically treat fluids in order to impart properties to the fluid which effectively contribute to descaling and the like by passing them through a magnetically oriented field which is either a predominantly south pole or predominantly north pole field.

Another object of the invention is to magnetically treat fluids by passing them through a magnetic field which has multiple south and north fields.

The preferred embodiment of the invention generally comprises a flexible magnet wrapped 1 or more times around and circumference of a conduit through which a fluid is passed. The flexible magnet arranged on the outside surface of the conduit in such a manner that the south pole is directed radially inwardly toward the central axis of the conduit and the north pole is directed radially outward away from the central axis in order to concentrate the south pole magnetic field more strongly upon the fluid. A means of holding said flexible magnet in place such as adhesive backing, plastic wire ties, tape, or other methods.

In an alternate embodiment, the orientation of the poles has been reversed such that the liquid is subjected to predominantly the north pole magnetic field. In yet another embodiment, the flexible magnet having multiple south and north poles directed generally radially toward the central axis and multiple south and north poles directed generally away from said central axis.

Another embodiment of the invention generally comprises a flexible magnet wrapped inside a conduit through which a fluid is passed. The flexible magnet arranged on the inside surface of the conduit in such a manner that the south pole is directed radially inwardly toward the central axis of the conduit and the north pole is directed radially outward away from the central axis in order to concentrate the south pole magnetic field more strongly upon the fluid.

In an alternate embodiment, the orientation of the poles has been reversed such that the liquid is subjected to predominantly the north pole magnetic field. In yet another embodiment, the flexible magnet having multiple south and north poles directed generally radially toward the central axis and multiple south and north poles directed generally away from said central axis. A means of holding said flexible magnet in place such as glue, epoxy, or other methods.

It is also contemplated that a flexible magnet could be wrapped around electrodes or other devices which may be directly in the flow of a fluid, or in a container of a fluid, so that the fluid surrounding it is treated reducing scale and the like on these devices.

The preferred embodiment of the subject magnetic fluid treatment device is shown by way of example in the accompanying drawings without attempting to show all of the various forms and modifications in which the invention might be embodied; the invention being measured by the amended claims, not by the details of this disclosure. These and other, further and more specific objects and advantages of the invention will be apparent to those skilled in the art from the following detailed description thereof, taken in conjunction with the drawings, in which:

Figure 1:
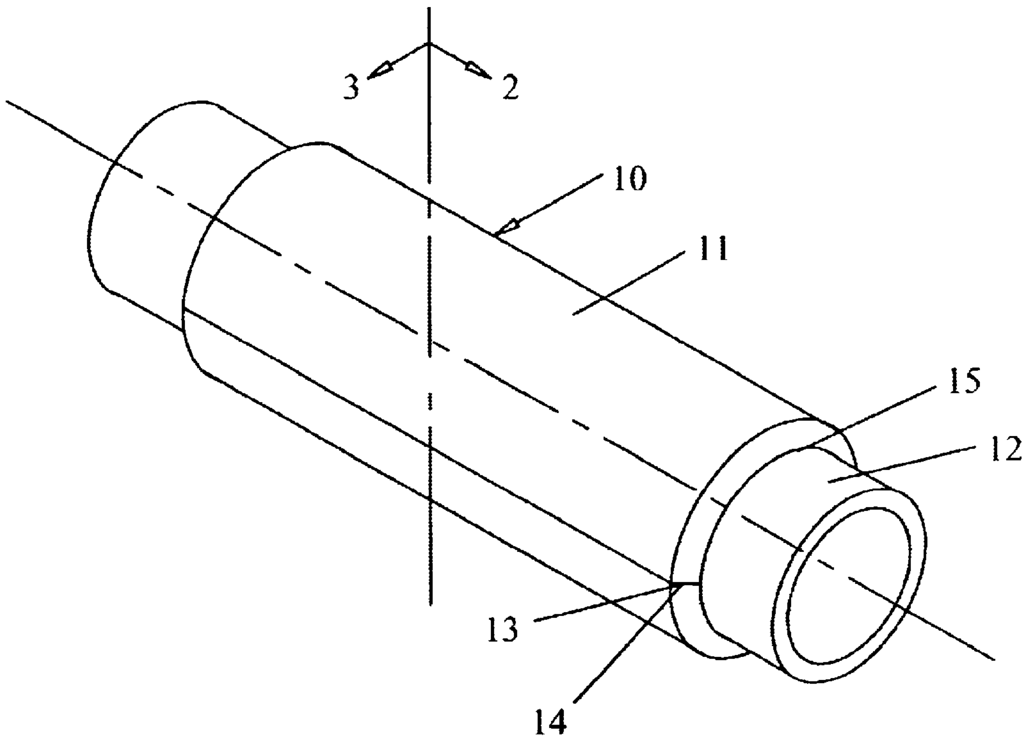
FIG. 1 is an exploded perspective view of one embodiment of the present invention according to the concepts of the present invention.

REFERENCE NUMBERS IN DRAWINGS 10 apparatus for the treatment of fluids
11 flexible magnet
12 conduit
13 leading edge of flexible magnet
14 trailing edge of flexible magnet
15 adhesive backing

DESCRIPTION OF THE PREFERRED EMBODIMENT

Figure 2:
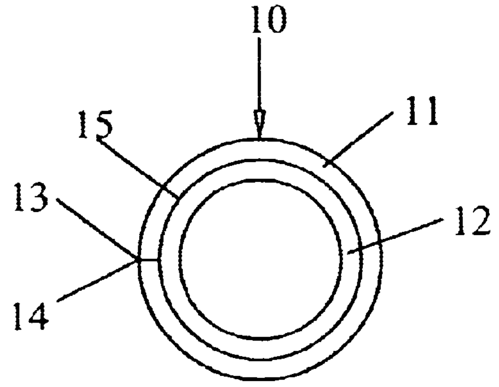
FIG. 2 is a side section view of the device of FIG. 1 taken substantially along line 2—2 of FIG. 1
Figure 3:
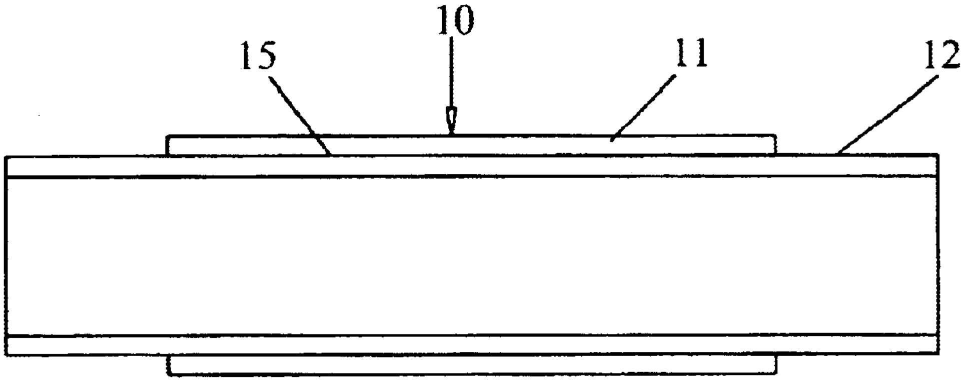
FIG. 3 is a side section view of the device of FIG. 1 taken substantially along line 3—3 of FIG. 1

Referring to FIGS. 1, 2, and 3 numeral 10 depicts an apparatus for the treatment of fluids constructed in accordance with the concepts of the present invention. The flexible magnet 11 is made of a high energy permanently magnetized flexible magnetic material which is corrosion resistant and magnetically oriented with the south magnetic pole located at the internal radius thereof and the north pole located at the external radius thereof. The flexible magnet 11 is wrapped completely around the circumference of conduit 12 with the leading edge 13 and the trailing edge 14 of the flexible magnet 11 butted against each other so that the conduit 12 is surrounded complete around its circumference. The flexible magnet 11 is attached to the conduit 12 by the adhesive backing 15 on the inside radius of the flexible magnet 11.

Thus it should be apparent from the foregoing description of the preferred embodiment that the subject apparatus for the treatment of fluids 10 as herein shown and described accomplished the objects of the invention and solved the problems attended to the magnetic treatment of fluids. Various modifications may be incorporated in the structure without departing from the scope of the present invention, namely, more than one wrap around the circumference of the conduit by the flexible magnet.

It is also to be understood that the following claims are intended to cover all of the generic and specific features of the invention herein described and all statements of the scope of the invention which, as a matter of language, might be said to fall therebetween.

What is claimed is:

1. An apparatus for magnetic treatment of fluids, and comprising: a single continuous length of a flexible magnet wrapped 1 or more times around the outside circumference of a conduit to provide magnetic treatment of a fluid; and a means for holding said flexible magnet around said conduit through which said fluid flows.

2. An apparatus as in claim 1, wherein said flexible magnet is wrapped around said conduit, having a south pole and a north pole with said south pole directed generally radially toward the central axis and said north pole directed generally away from said central axis.

3. An apparatus as in claim 1, wherein said flexible magnet is wrapped around said conduit, having a south pole and a north pole with said north pole directed generally radially toward the central axis and said south pole directed generally away from said central axis.

4. An apparatus as in claim 1, wherein said flexible magnet is wrapped around said conduit, with said flexible magnet having multiple south and north poles directed generally radially toward the central axis and multiple south and north poles directed generally away from said central axis.

5. An apparatus as in claim 1, wherein said flexible magnet is wrapped around said conduit, with said flexible magnet having a thickness of 0.020 to 0.50 inches.

6. An apparatus as in claim 1, wherein said flexible magnet is wrapped around said conduit, with said flexible magnet having a width ½ to 8 times the diameter of said conduit measured along the length of said conduit.

7. An apparatus as in claim 1, wherein said flexible magnet is wrapped completely around said conduit's circumference, 1 to 24 times.

8. An apparatus for magnetic treatment of fluids, and comprising: a single continuous length of a flexible magnet wrapped 1 or more times inside a conduit to provide magnetic treatment of a fluid; and a means for holding said flexible magnet onto said conduit's inside surface through which said fluid flows.

9. An apparatus as in claim 8, wherein said flexible magnet is wrapped inside said conduit, with said flexible magnet having a south pole and a north pole with said south pole directed generally radially toward the central axis and said north pole directed generally away from said central axis.

10. An apparatus as in claim 8, wherein said flexible magnet is wrapped inside said conduit, with said flexible magnet having a south pole and a north pole with said north pole directed generally radially toward the central axis and said south pole directed generally away from said central axis.

11. An apparatus as in claim 8, wherein said flexible magnet is wrapped inside said conduit, with said flexible magnet having multiple south and north poles directed generally radially toward the central axis and multiple south and north poles directed generally away from said central axis.

12. An apparatus as in claim 8, wherein said flexible magnet is wrapped inside said conduit, with said flexible magnet having a thickness of 0.020 to 0.50 inches.

13. An apparatus as in claim 8, wherein said flexible magnet is wrapped inside said conduit with said flexible magnet having a width ½to 8 times the diameter of said conduit measured along the length of said conduit.

14. An apparatus as in claim 8, wherein said flexible magnet is wrapped inside said conduit's inside circumference 1 to 4 times.

* * * * *